W. Wilbur,
Oil Press.
№ 13,558.   Patented Sep. 11, 1855.
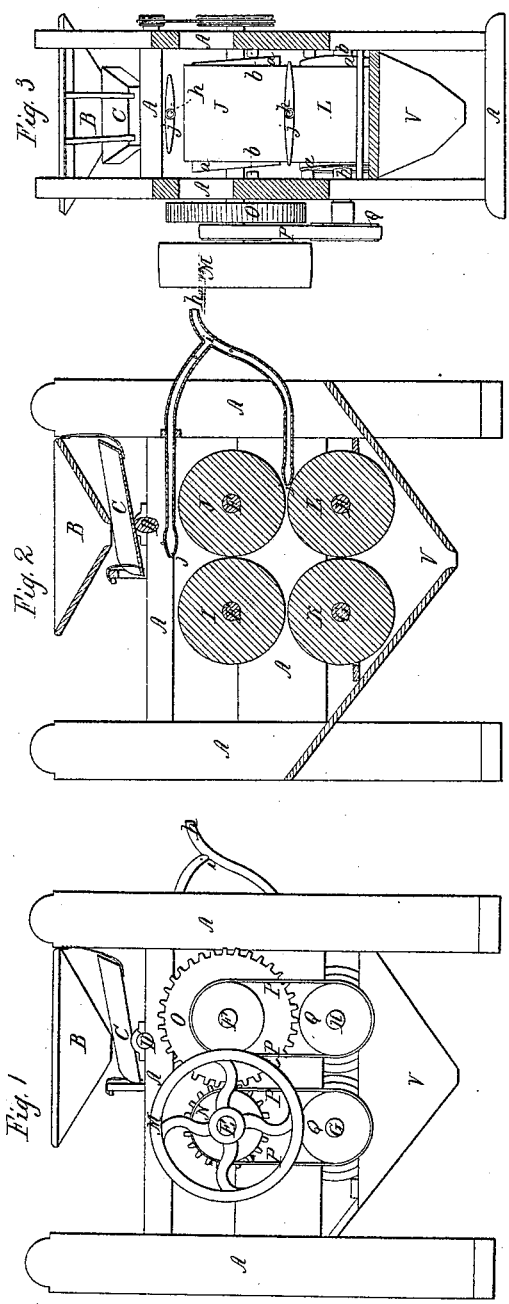
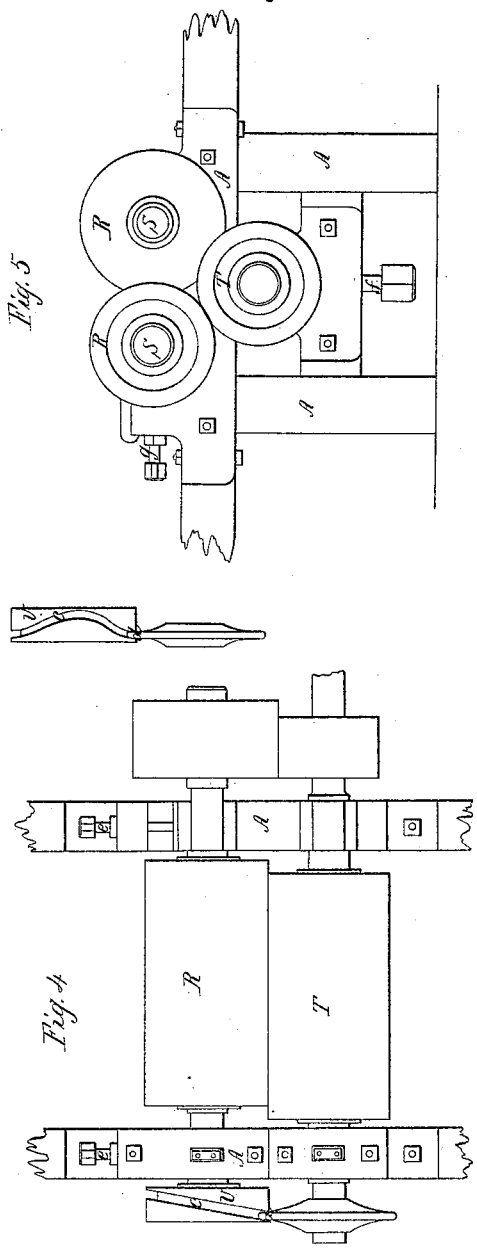

UNITED STATES PATENT OFFICE.

WILLIAM WILBER, OF NEW ORLEANS, LOUISIANA.

GRINDING COTTON AND OTHER SEED FOR THEIR OILS.

Specification of Letters Patent No. 13,558, dated September 11, 1855.

*To all whom it may concern:*

Be it known that I, WILLIAM WILBER, of the city of New Orleans, in the parish of Orleans and State of Louisiana, have invented certain new and useful Improvements in Machines for Grinding Cotton and other Seed for Their Oils; and I do hereby declare the following to be a full, clear, and exact description of the same, reference being had to the accompanying drawings, making a part thereof, in which—

Figure 1, represents a side elevation of the machine. Fig. 2, represents a vertical longitudinal section thereof. Fig. 3, represents an end elevation. Figs. 4, 5 and 6, represent modifications of the crushing rollers.

Similar letters in the figures denote like parts.

The nature of my invention consists in the application of jets of steam for lubricating the surfaces of cylinders for grinding cotton seeds to prevent their gumming up, or being clogged by the ground material.

To enable others skilled in the art to make and use my invention, I will proceed to describe the same with reference to the drawings.

A stout substantial frame A of suitable size for supporting the several parts of the machine is first made, on the top of which is arranged a hopper B, for receiving the seed to be ground. To this hopper is suspended, or to the frame so as to hang underneath the hopper, a shoe C, which is struck by the cam D, on the shaft D', to agitate the seed and cause them to descend on said shoe, which is slightly inclined for the purpose. On this frame in suitable bearings are supported by their journals E, F G, H, four rollers I, J, K, L, making two pairs—those I, J, having their peripheries in contact or nearly so, and those K, L, having their peripheries in contact also and placed directly underneath the first named pairs. These rollers, may be faced with steel or may be made of chilled cast iron. On the journal E of one of the rollers, is placed a pulley M, around which a belt from any first mover may pass to give motion to the rolls which are geared together in pairs so as to turn toward each other. Inside of the drum or pulley and on the same shaft E, is placed a cog wheel N, which meshes with a larger cog wheel O, on the journal F of the roller J. The difference in the size of the cog wheels N, O, is for giving different velocities to the peripheries of the rollers I, J, so that one shall slip on the other. The pairs of lower rollers K, L, are geared to the upper pair and driven by the endless belts P, P, passing over pulleys Q Q on the lower pairs. This gives the pairs of rollers a motion around their axes. Cam projections or ledges *a a* are made on the ends of the rollers, which run against stationary studs *b, b*, attached to the inside of the frame (Fig. 3), and these cams and studs give the rollers a sliding or reciprocating motion parallel with their axes. The rollers (or at least one of each pair) therefore have a double motion viz: a rotating and a reciprocating one. The rotating motion carries the seeds to be crushed between the rolls, and the reciprocating motion aids in crushing, as it causes the surface of one roller to slip against that of the other. Both rolls of the pairs may have this double motion, if found desirable one slipping in one direction while the other moves in a contrary direction. Figs. 4, 5, and 6, represent a modification of these rolls, three only being used instead of four as in the other plan. When three rollers are used the upper ones R, may be set with their axes S, S, on the same plane, and the third one T, with its axis between those of the others as seen in Fig. 5, and underneath the others. And instead of the cam planes *a*, and studs *b*, as in the other plan, a groove *c*, may cut spirally in the face of a wheel U, on the shaft or axis of the roll, and the edge *d*, of a wheel on the shaft of one of the other rolls, may work in said groove to give one of the rolls a reciprocating motion as well as its rotary motion against the others. Or as in Fig. 6, the cam may have a zig zag groove or direction on the face of the wheel, so as to receive more transverse movements in proportion to its rotation. But these are all obvious modifications of the same thing viz: giving to one two or more of the rolls a double motion—one around, and the other parallel to its axis. This is not merely to facilitate the crushing of the material that passes between the rolls, but it spreads the material out over the whole length of the rolls, making every portion of them do its share of the work. And by so doing the rolls do not wear away in their centers only, but along their whole length, and wearing evenly of course do not require dressing so often.

$e$ in Fig. 4, represents the set screws for adjusting the upper to the lower roll, and $f$, in Fig. 5, represents the same device for setting the lower to the upper ones.

$g$, in Fig. 5, is for adjusting the top rolls to each other.

In Figs. 1, 2, $h$, represents a steam pipe connecting with a steam generator, said pipe branching at $i$ and each terminating in a long nozzle $j, j$, (Fig. 3), which has a narrow slot in its entire length, or a series of small holes through which a thin jet, or a series of small jets of steam passes, either to the seeds as they fall toward the rolls, or after they are between the rolls or both, the object being to heat and moisten the seeds while undergoing the crushing process, which greatly facilitates it, and which also prevents the gumming of the rollers—the steam acting as a lubricator. The crushed seed falls into the hopper V, whence it is carried away to any suitable reheater, or immediately to the press.

Having thus fully described the nature of my invention, what I claim therein as new and desire to secure by Letters Patent is—

The application of jets of steam for lubricating the surfaces of cylinders for grinding cotton seeds to prevent their gumming up, or being clogged by the ground material, substantially in the manner described.

WILLIAM WILBER.

Witnesses:
A. B. STOUGHTON,
THOMAS H. UPPERMAN.